March 5, 1957     W. E. GREENAWALT     2,784,081
ORE SMELTING PROCESSES
Filed Oct. 20, 1953
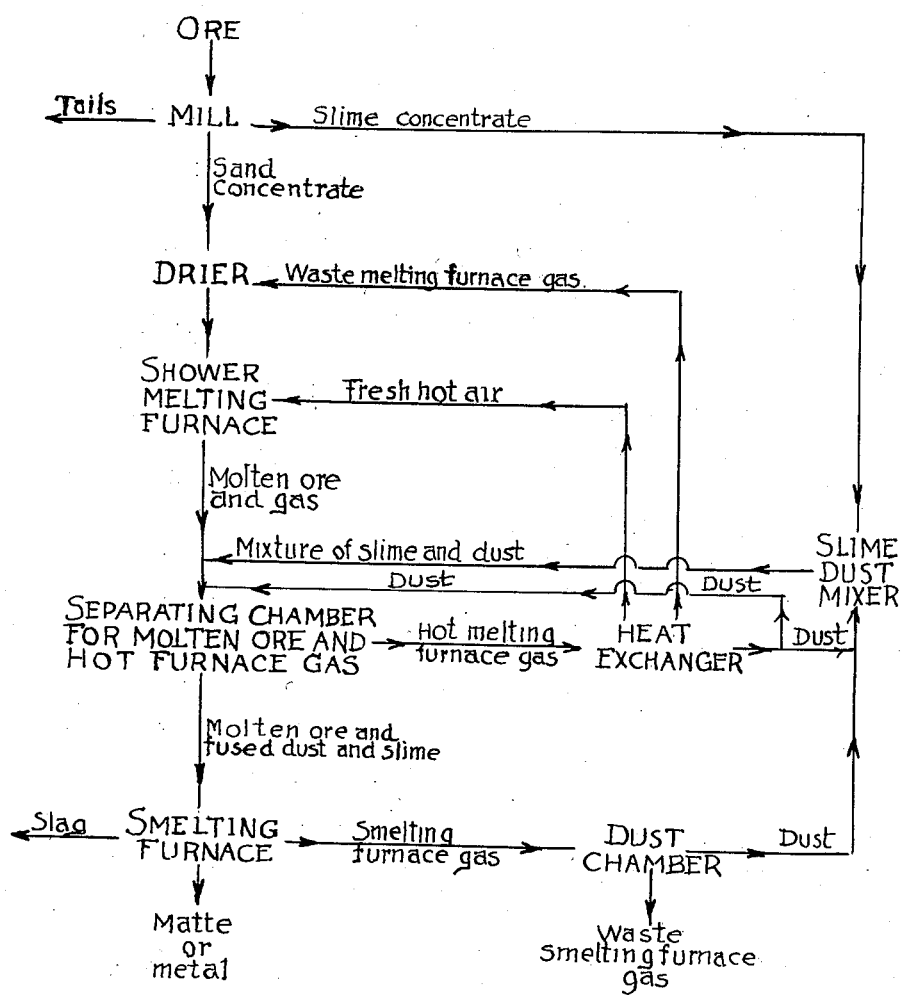
INVENTOR.
William E. Greenawalt United States Patent Office 2,784,081
Patented Mar. 5, 1957

2,784,081

ORE SMELTING PROCESSES

William E. Greenawalt, Denver, Colo.

Application October 20, 1953, Serial No. 387,175

7 Claims. (Cl. 75—72)

My invention relates in general to ore smelting processes. It is directed, and will be described more particularly, to the smelting of finely divided sulphide copper ore, such as flotation concentrate.

The dust produced in ore smelting processes has always presented a major problem, and is intensified in the smelting of flotation concentrates. It is usually collected from a large volume of roaster and smelter gas, and recharged into the smelting furnace. So charged, it creates an abnormal amount of dust and gas, and the large amount of highly heated dust and useless gas in the smelting furnace atmosphere limits the capacity of the furnace and shortens its use. It is evident that if the ore and the collected dust could conveniently be charged in a molten state into the smelting furnace, the large volume of harmful and useless dust laden gas could be eliminated from it, repairs would be greatly diminished, the life of the furnace would be prolonged, and the capacity of the furnace would be two to four times that of the usual practice of charging the ore cold and wet, and adding the recovered dust to the smelting furnace in the usual way. The fuel required for smelting would also be enormously reduced.

The object of this invention is to realize these and other advantages in practice.

The process will be described in connection with the accompanying drawing, which represents a flow diagram of the invention. The ore as it comes from the mine is delivered to the mill to be concentrated into sand and slime concentrates. The slime concentrate represents a small portion of the whole, usually between one and three percent, which when charged into a roasting or smelting furnace, would result in dust. The sand concentrate, with the dust removed, represents the remainder. Practice will determine the dividing line between them. With the slimes removed there will be much less dust produced in the subsequent melting and smelting of the sands.

The sand concentrate, usually about 97 to 99 percent of the whole, is delivered to the drier to be dried and heated for further treatment. Drying the sands with the slimes removed, facilitates the drying and also eliminates the dust. The dried ore is then showered through the highly heated atmosphere of the melting furnace to bring it to a molten condition. The molten ore and the hot melting furnace gas flows into a closed separating chamber, or separator, to separate the molten ore from the hot gas.

The hot melting furnace gas from the separating chamber flows into the heat exchanger to separate most of the dust from the gas, to heat fresh air for other uses in the process, and to reduce the temperature of the melting furnace gas for drying fresh ore. The melting furnace gas, lowered in temperature, but still quite hot, is transferred to the drier to dry the ore preparatory to showering it through the melting furnace. The settled dust, recovered from the heat exchanger, is returned in whole or in part to the separating chamber where it is fused and combined with the molten sands. The melting furnace gas, reduced in dust, flows into the dust chamber, to recover the remaining dust. The dust chamber dust from the melting and smelting furnaces is preferably mixed with the wet slime concentrate and charged into the separating chamber to be fused and combined with the molten sands. The slime concentrate and the dust chamber dust might be charged separately into the separating chamber, but it is better to pre-mix them to produce a moist mixture free from dust and excessive moisture. If desired, part of the dust from the heat exchanger may be added to the mixture. The small amount of moist dust charged into the separating chamber will not produce any more dust than an equal amount of ore charged direct into the smelting furnace, and the amount so charged is only a small part of the whole.

The molten mixture of sands, fused dust and slimes, freed from the melting furnace gas and dust, flows from the separating chamber into the smelting furnace, where the matte or molten metal is separated from the slag, and both are separately tapped from the smelting furnace.

It is usually desirable, in smelting copper sulphide concentrate, to recover the copper at matte, which consists mostly of copper, iron, and sulphur. The quality of the matte can be regulated by the amount of sulphur retained in the molten charge, and this can be determined by the amount of oxidation in the melting furnace. A sulphide particle, under high temperature and sufficient air, can be instantly fused and almost completely oxidized, and the grade of matte desired can be obtained by regulating the amount of air in the melting furnace. But the best way to control the quality of the matte is through the addition of the sulphide slime concentrate to the molten ore in the separating chamber, preferably, but not necessarily, by first mixing it with recovered dust from the dust chamber. This provides a simple way to take care of the dust and of the slime concentrate. It excludes dust from the smelting furnace, reduces to a minimum the amount of dust produced in fusing the relatively small amount of slime and dust in the separating chamber than there is produced in smelting the same small amount of the total wet ore in the usual way.

The amount of gas passing through the smelting furnace in my process will be small as compared with that produced in present practice. It is estimated that it takes 6,376,000 B. t. u. to smelt a ton of wet copper concentrate at 65 deg. F., and only 1,900,000 if the charge is preheated to 1200 deg. F. If the charge is molten, say at 2300 deg. F., it would require considerably less than 1,000,000 B. t. u., and the greatly reduced draft in the smelting furnace would also reduce the amount of dust produced. This is simpler and cheaper than it is to recover the dust from a large volume of useless gas in the usual way. The dust produced in the melting furnace, charged with hot dry sands, with the slimes eliminated, would also be greatly reduced. In addition to that, a fused smooth round particle of dust will settle much better than the same unfused particle, both in the heat exchanger and in the separating chamber. The gas issuing from the separating chamber, high in sulphur dioxide and reasonably free from dust, would be an excellent product for the manufacture of sulphuric acid.

It may be convenient to carry the elimination of sulphur in the melting furnace beyond that required to produce the desired matte in the smelting furnace for refining, and then restore the necessary sulphur to produce the matte desired by charging the raw sulphide slime concentrate into the gas separating chamber, and combine it with the molten sand concentrate to fuse it before it is charged into the smelting furnace. This makes close regulation of sulphur unnecessary in the melting furnace, and offers a cheap and effective way to treat the slime concentrate.

I claim:

1. An ore smelting process comprising, treating finely divided metallic ore to produce sand and slime concentrates, showering the sand concentrate through the highly heated atmosphere of a melting furnace to melt it, flowing the molten sand concentrate and the hot melting furnace gas into an enclosed separating chamber to separate the molten sand concentrate from the hot melting furnace gas, withdrawing the melting furnace gas from the separating chamber, charging the slime concentrate into the separating chamber to fuse it, flowing the mixture of molten sand concentrate and fused slime concentrate separated from the melting furnace gas into a smelting furnace to separate the molten metal product from the molten ore slag, and separately withdrawing the molten metal product and the molten ore slag from the smelting furnace.

2. An ore smelting process comprising, treating finely divided metallic ore to produce sand and slime concentrates, showering the sand concentrate through the highly heated atmosphere of a melting furnace to melt it, flowing the molten sand concentrate and the melting furnace gas into an enclosed separating chamber to separate the molten sand concentrate from the melting chamber gas, withdrawing the melting furnace gas from the separating chamber, removing and recovering the dust from the withdrawn melting furnace gas, charging the removed and recovered dust into the separating chamber to fuse it, flowing the mixture of molten sand concentrate and fused dust separated from the melting furnace gas into a smelting furnace to separate the molten metal product from the molten ore slag, and separately withdrawing the molten metal product and the molten ore slag from the smelting furnace.

3. An ore smelting process comprising, treating finely divided metallic ore to produce sand and slime concentrates, showering the sand concentrate through the highly heated atmosphere of a melting furnace to melt it, flowing the molten sand concentrate and the hot melting furnace gas into an enclosed separating chamber to separate the molten sand concentrate from the hot melting furnace gas, withdrawing the melting furnace gas from the separating chamber, removing and recovering the dust from the withdrawn melting furnace gas, mixing the removed and recovered dust with the slime concentrate, charging the mixture of dust and slime concentrate into the separating chamber to fuse it, flowing the mixture of molten sand concentrate and fused dust and slime concentrate separated from the melting furnace gas into a smelting furnace to separate the molten metal product from the molten ore slag, and separately withdrawing the molten metal product and the molten ore slag from the smelting furnace.

4. An ore smelting process comprising, treating finely divided metallic ore to produce sand and slime concentrates, showering the sand concentrate through the highly heated atmosphere of a melting furnace to melt it, flowing the molten sand concentrate and the hot melting furnace gas into an enclosed separating chamber to separate the molten sand concentrate from the hot melting furnace gas, adding the raw slime concentrate to the molten sand concentrate in the separating chamber, then flowing the mixture of molten sand and slime concentrate into a smelting furnace to separate the molten metal product from the molten ore slag, and separately withdrawing the molten metal product and the molten ore slag from the smelting furnace.

5. An ore smelting process comprising, treating finely divided sulphide copper ore to produce sand and slime concentrates, showering the sand concentrate through the highly heated atmosphere of a melting furnace to melt it, separating the resulting molten sand concentrate from the hot melting furnace gas, mixing the raw slime concentrate with the molten sand concentrate, and smelting the molten mixture of sand and slime concentrate separated from the melting furnace gas to separate the resulting copper matte from the molten ore slag.

6. An ore smelting process comprising, treating finely divided metallic ore to produce sand and slime concentrates, showering the sand concentrate through the highly heated atmosphere of a melting furnace to melt it, separating the molten sand concentrate from the melting furnace gas, adding the slime concentrate to the molten sand concentrate, and smelting the molten mixture of sand and slime concentrate separated from the melting furnace gas to separate the molten metal product from the molten ore slag.

7. An ore smelting process comprising, treating finely divided sulphide copper ore to produce sand and slime concentrates, showering the sand concentrate through the highly heated atmosphere of a melting furnace to melt it and to eliminate sulphur below that desired for matte requirements in smelting, flowing the molten sand concentrate and the hot melting furnace gas into a separating chamber to separate the hot gas from the molten sand concentrate, charging the raw sulphide slime concentrate into the separating chamber in amounts desired to restore sulphur for matte requirements in the smelting furnace to fuse it, then transferring the mixture of molten sand and slime concentrate into a smelting furnace to smelt it and separate the molten copper matte from the molten ore slag.

References Cited in the file of this patent
UNITED STATES PATENTS

| | | |
|---|---|---|
| 977,996 | Baggaley | Dec. 6, 1910 |
| 2,194,454 | Greenawalt | Mar. 19, 1940 |
| 2,506,557 | Bryk et al. | May 2, 1950 |